United States Patent [19]

Pozil et al.

[11] Patent Number: 5,143,463
[45] Date of Patent: Sep. 1, 1992

[54] WRITING AID

[76] Inventors: Richard L. Pozil, 10333 Mississippi Ave., Los Angeles, Calif. 90025; Lois J. Provda, 208 Lasky Dr., Beverly Hills, Calif. 90212

[21] Appl. No.: 833,465

[22] Filed: Feb. 7, 1992

Related U.S. Application Data

[63] Continuation of Ser. No. 632,811, Dec. 24, 1990, abandoned.

[51] Int. Cl.$^5$ .................. G09B 11/00; A46B 5/02; B43K 3/00
[52] U.S. Cl. .......................... 401/6; 434/166; 15/443
[58] Field of Search ....................... 401/6-8; 434/166, 162; 15/443, 445

[56] References Cited

U.S. PATENT DOCUMENTS

| | | | |
|---|---|---|---|
| 836,652 | 11/1906 | Rosdahl | 401/6 X |
| 2,459,993 | 1/1949 | Crain | 401/6 |
| 2,782,764 | 2/1957 | Lehman | 15/443 |
| 2,996,044 | 8/1961 | Parker | 401/6 X |
| 3,947,977 | 4/1976 | Bishop | 401/6 X |
| 4,596,335 | 6/1986 | Hull | 401/6 X |
| 4,832,604 | 5/1989 | Rusk | 401/6 X |

FOREIGN PATENT DOCUMENTS

| | | | |
|---|---|---|---|
| 39911 | 9/1973 | Australia | 434/166 |
| 5880 | 10/1894 | Sweden | 15/443 |

Primary Examiner—Danton D. DeMille
Attorney, Agent, or Firm—Cislo & Thomas

[57] ABSTRACT

A writing aid is provided which facilitates the correct positioning of the hand of the user on a writing instrument and insures a relaxed, stress-free grip during the writing process. The writing aid comprises a small, generally pear-shaped body with a cylindrical hole running through the length thereof for insertion of the writing instrument, with the smaller end of the aid intended to be nearer the writing tip of the instrument. In a preferred embodiment the smaller end of the writing aid has a flat, truncated end surface. The larger end of the writing grip is bulbous and supports the first knuckle of the thumb and index finger to hold the fingers in extended position. First, second, and third concave depressions lie on lateral portions of the body, near the smaller end, spaced roughly 120 degrees apart, and are grasped by the thumb, index finger, and middle finger, respectfully, of a right-handed writer or the index finger, thumb, and middle finger, respectively, of a left-handed writer. The writing aid is preferably made of soft, resilient material, which provides a pliable surface and relaxes the fingers.

25 Claims, 1 Drawing Sheet

U.S. Patent  Sep. 1, 1992  5,143,463
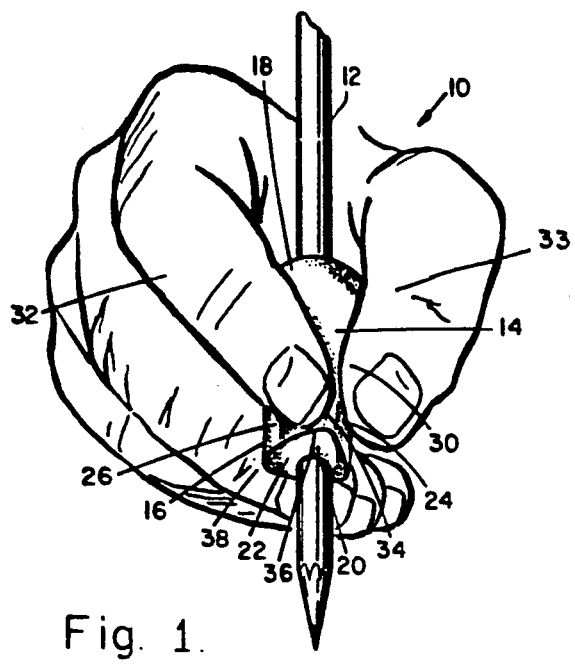
Fig. 1.
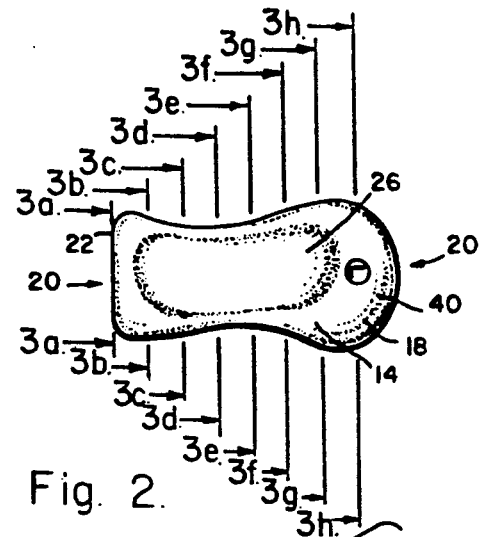
Fig. 2.
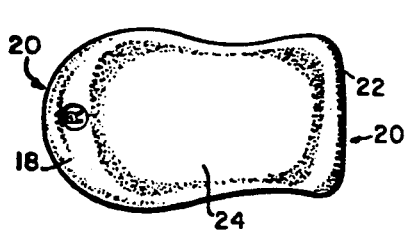
Fig. 4.
Fig. 3.
FIG. 3h.
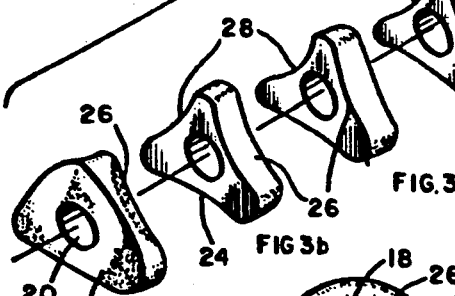
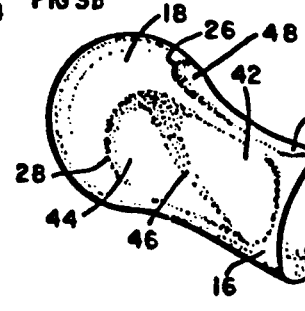
Fig. 5.
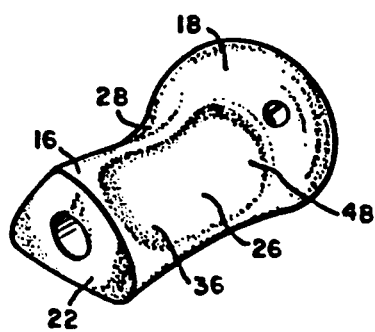
Fig. 6.

WRITING AID

RELATED APPLICATION

This application is a continuation application of Ser. No. 07/632,811, filed Dec. 24, 1990, now abandoned.

BACKGROUND

Many patents have issued which are directed to the general topic of facilitating the gripping of writing instruments for the purposes of forming good habits by persons just learning to write and preventing muscular fatigue and cramping, even in those persons who already know how to write. Some examples of such writing aids are described below.

U.S. Pat. No. 843,767 to Plach is directed to an improved pen holder with three opposed surfaces adapted to fit the hand of the user. In addition to three curved grooves adapted to hold the fingers of the user in a correct writing position, the device comprises a curved portion adapted to that part of the hand between the thumb and the forefinger. This device is a penholder and not a writing aid designed to fit over a writing instrument.

U.S. Pat. No. 4,030,841 to D. Balasty is directed to a triangular shaped pen or pencil and a triangular shaped device for use and holding of a pen or pencil, such as by sliding the device over the length of the writing instrument and thereby facilitating the triangular shape of the fingers during writing.

U.S. Pat. No. 4,076,427 to Anderson is directed to a writing instrument such as a pen having a shaft for hand-held use. The shaft is formed with three elongated concave indentations in a generally equilateral triangular configuration with rounded vertices and at least one concave side as seen in cross section in the region normally grasped which form sockets to receive the thumb, index finger, and middle fingers respectively.

U.S. Pat. No. 4,149,811 to Coffman is directed to a style handle for writing and engraving instruments. The base portion of the style, gripped when the style is used, consists of three essentially flat surfaces arranged in a triadic spiral at a selected pitch conforming with an individual's finger grip when the style is held in a normal manner. The edges of the spiral lie in the grooved portions between the thumb and fingers with the thumb and fingers resting upon the flats of the spiral in a relaxed, natural manner.

U.S. Pat. No. 4,167,347 to Hoyle is directed to a removable finger grip adaptable to a wide variety and size of writing instruments. The finger grip is an elongate resilient body having a triangular cross-sectional shape and a cylindrical bore coaxial with the longitudinal axis of the writing instrument. The cylindrical bore has a plurality of ribs or ridges for accommodating a wide variety of sizes of writing instruments. The triangular shape provides three planar surfaces for gripping the device and also provides a thin web of materials in the planar gripping surfaces between them and the cylindrical bore at the center of the gripping surfaces.

U.S. Pat. No. 4,452,547 to Rusk is directed to a method for teaching persons how to hold writing instruments properly as well as a writing aid for facilitating the method of teaching. The device disclosed is very similar to the one disclosed in U.S. Pat. No. 4,689,020 to Rusk.

U.S. Pat. No. 4,689,020 to Rusk discloses a writing aid device. As can be seen in FIGS. 6 and 7, the forefinger is inserted into a depression on the writing aid 10, which is apparently designed to be gripped by the hand 22 of the user and provides for three gripping surfaces 42/44/46. The surface 42 receives the user's first finger 24 for positioning the user's finger 24 with respect to the pencil 12. The second gripping surface 44 receives the user's index finger 26. The third gripping surface 48 receives the user's finger 28.

U.S. Pat. No. 4,832,604 to Rusk is a continuation of U.S. Pat. No. 4,689,020 to Rusk. In the continuation, it is disclosed that body 36 of writing aid 10 is preferably made of a soft, pliable plastic material.

U.S. Pat. No. 1,817,456 to Parsons is directed to a writing instrument comprising a sleeve 10 of "metal, wood, cork, or any composition" provided with a bore whose diameter is such that a pencil, pen, or other writing instrument can be frictionally engaged thereby. The outer periphery of the sleeve at one end is provided with a depression 11 which forms a seat for the end of the thumb, while depressions 12 and 13 provide seats for the index and second fingers, respectively. The other end of the sleeve forms a shoulder adapted to bear against the edge of the palm of the writer at the base of the thumb and first finger.

Australian Patent Specification 39,911 to Nagy is directed to a handwriting improver gadget comprising an attachment for a more comfortable and agreeable grasping of a writing instrument. Three grooves are formed on the gadget in such a way that normal, average human fingers lie snugly in them in their most natural position This reference states that flexible materials seem to be more favorable than other materials because they may be attached to instruments of differing diameters and can be moved to a position on the instrument most comfortable to the individual user. The single figure of the drawing for this reference discloses a somewhat oblong device with its larger end nearest the point of the pencil inserted through the device. A rather extensive (in terms of surface area of the device) depression is provided for the thumb, and a deep but apparently smaller depression is provided for the third finger. The depression for the forefinger is hidden from view in the figure.

Taiwanese Patent Application 6925529 to Chun Yu Chang is directed to a ball-like body which is hollow and is attachable to a pen. The device has grooves on the gripping surface for transmitting the stress exerted by the fingers to the tip of the pen so as to induce a correct gripping method for children and to provide a means of gripping for those who cannot hold a standard pen. The drawing discloses a device with gripping surfaces that appear to be planar for the thumb and first fingers. The gripping surface for the middle finger is hidden from view in the figures. A sectional view through the device seems to indicate some sort of spring arrangement inside the device.

In addition to the patents described briefly above, the following U.S. patents may have some relevance to the present invention;

| U.S. Pat. Number | Name of Inventor | Date Issued |
| --- | --- | --- |
| 217,499 | C. R. Wells | July 15, 1879 |
| 249,893 | J. S. Bulkeley | Nov. 22, 1881 |
| 447,873 | C. Hanimann | March 10, 1891 |
| 794,329 | W. A. Whitehouse | July 11, 1905 |
| 945,026 | C. A. Faust | Jan. 4, 1910 |
| 1,184,155 | W. W. Williams | May 23, 1916 |

| U.S. Pat. Number | Name of Inventor | Date Issued |
|---|---|---|
| 1,291,972 | M. J. McGuigan | Jan. 21, 199 |
| 1,793,945 | J. Mauthe | Feb. 24, 1931 |
| 1,807,415 | D. J. La France | May 26, 1931 |
| 1,879,456 | L. B. Parsons | Sept. 27, 1932 |
| 2,173,451 | C. Lorber | Sept. 19, 1939 |
| 2,236,194 | C. Lorber | March 25, 1941 |
| 2,870,740 | T. B. H. Vogt | Jan. 27, 1959 |
| 3,501,849 | M. E. Olsen | March 24, 1970 |
| 3,947,977 | Bishop | April 6, 1976 |
| 4,035,089 | Schwartz et al. | July 12, 1977 |
| 4,056,325 | Maruyama | Nov. 1, 1977 |
| 4,601,598 | Schwartz et al. | July 22, 1986 |
| 4,602,885 | Bischoff et al. | July 29, 1986 |
| 4,917,517 | Ertz | April 17, 1990 |

None of the patents described or mentioned above discloses a writing aid as is provided by the present invention. Writing aids with triangular gripping arrangements do not provide gripping surfaces that keep the first finger, second finger, and third finger in place and can therefore be gripped improperly. Furthermore, triangular devices are not comfortable for the user because one edge of the triangular device digs into the hand when it is not gripped properly. Other devices provide gripping surfaces for the fingers that are either too small or too hard, and those devices are difficult to grip properly.

SUMMARY OF THE INVENTION

A writing aid for use with a pen or pencil is provided which facilitates the correct positioning of the hand of the user on the writing instrument and insures a relaxed, stress-free grip during the writing process. The writing aid comprises a small, generally pear-shaped body with a cylindrical hole running through the length thereof for insertion of the writing instrument.

When the writing aid is properly oriented on a writing instrument, the smaller end of the aid is nearer the writing tip of the instrument.

First, second, and third concave depressions lie on lateral portions of the body, near the smaller end, spaced roughly 120 degrees apart. The thumb, index finger, and middle finger of the hand of a right-handed user contact the first, second, and third depressions on the writing instrument. In the case of a left-handed user, the second and third depressions are grasped by the thumb and middle fingers, respectfully, of the left hand.

The writing aid is preferably made of soft rubber, which provides a pliable surface and relaxes the fingers. In a preferred embodiment the smaller end of the writing aid has a flat, truncated end surface. The larger end of the writing grip is bulbous and supports the first knuckle of the thumb and index finger to hold the fingers in extended position. This discourages scribbling with fingers only and encourages full hand and arm action to reduce fatigue, improve handwriting, and prevent "white knuckling."

The first depression on the writing aid has a shape to fit that portion of the right-handed thumb comprising most of the ball and tip thereof on the side of the thumb nearer the index finger, and extending from near the tip of the thumb to the first joint The second depression has a shape to fit the index finger, with the lower fleshy part of the tip of the index finger resting on the main area of the depression and the distal end of the index finger being in contact with an upcurved portion of the depression adjacent the smaller end of the writing aid. The third depression has a shape to fit that portion of the middle finger at the first joint on a side nearer the index finger, with the middle finger oriented in a position roughly halfway between a direction along the longitudinal axis of the writing instrument and a direction at right angles thereto. The third depression has a slight diagonal crease which rests on the first joint of the middle finger of a right-handed user Although the roles of the first and second depressions are reversed in the case of a left-handed user, the device is found to be equally effective for both right-handed and left-handed users.

The writing aid is provided in two sizes, one for regular and larger hands and one for small hands. The regular size has an overall length of about 5 cm, whereas the writing aid model for smaller hands has an overall length of about 3.5 cm. The bulbous end of the larger device has a circumference of about 8.5 cm, and the circumference of the bulbous end of the smaller device is about 7.5 cm.

Indicia on the writing aid indicate the proper orientation of the aid on a writing instrument and to indicate which finger of the user is to contact which portion of the aid.

Accordingly, it is an object of the present invention to provide a writing aid for use in combination with a writing instrument to promote the correct gripping thereof and to prevent writer's cramp.

Another object of the present invention is to provide a writing aid which has a roughly pear-shaped body made of pliable rubber with a hole through the longitudinal axis of the body for the insertion of a writing instrument.

Yet another object of the present invention is to provide a writing aid with three concave depressions near the smaller end thereof which are in contact with the thumb, index finger, and middle finger of a user in a comfortable, relaxed position during the writing process.

Still another object of the invention is to provide a writing aid which can be used with equal facility and effectiveness by either a right-handed or left-handed person.

Another object of the present invention is to provide a writing aid which comes in two sizes, one for regular or larger hands and another for small hands.

One more object of the invention is to provide a writing aid having a bulbous larger end and a truncated, flat smaller end with three concave finger-gripping surfaces on lateral portions of the writing aid near the smaller end.

Yet another object of the present invention is to provide a writing aid with a bulbous part of the grip supporting the first knuckle of the thumb and index finger and holding the fingers in extended position.

Finally, it is an object of the present invention to provide a writing aid that reduces stress on the fingers to preclude "white knuckling," which causes writer's cramp and stress that discomforts the user and interferes with cognitive functioning.

These and other objects and features of the present invention will apparent from the following detailed description taken with reference to the figures of the accompanying drawing, wherein like elements are denoted by like reference numerals.

BRIEF DESCRIPTION OF THE DRAWING

FIG. 1 is a perspective view of the writing aid of the present invention installed on a pencil and being used by a right-handed person;

FIG. 2 is a top plan view of the writing aid, the surface shown in FIG. 1 as being in contact with the index finger;

FIG. 3 is an exploded, multi-sectioned perspective view of the writing aid, with the sections as indicated in FIG. 2;

FIG. 4 is a side elevational view of the writing aid, the side shown in contact with the thumb in FIG. 1;

FIG. 5 is a perspective view of the writing aid, with the largest visible surface being that surface in contact with the middle finger in FIG. 1; and FIG. 6 is a perspective view of the writing aid oriented at right angles to the view of FIG. 5, with the largest visible surface being that shown in the top plan view of FIG. 2.

DETAILED DESCRIPTION OF THE INVENTION

Referring to FIG. 1, a writing aid 10 for use in conjunction with a writing instrument 12 is depicted being held in the right hand of a person using the writing aid 10. Writing aid 10 comprises a generally pear-shaped body 14 having a first, smaller end 16 and a larger, second end 18. A cylindrical hole 20 through body 14 allows passage of writing instrument 12 through writing aid 10. In a preferred embodiment, smaller end 16 has a truncated, flat end face 22 which is at right angles to a longitudinal axis from first end 22 to second end 18 and centered on the central axis of cylindrical hole 20.

On lateral portions of body 14 adjacent smaller end 16 are first, second, and third concave depressions 24, 26, and 28, respectively, only two of which can be partly seen in FIG. 1. First depression 24 has a shape designed to fit that portion of a human thumb 30 comprising most of the ball and tip thereof on the side of thumb 30 nearer index finger 32, and extending from near the tip of thumb 30 to a first joint 33 of thumb 30. Concave depression 26 has a shape designed to fit index finger 32, with a lower tip 34 resting on depression 26, which has an upcurved portion 36 adjacent end surface 22 of body 14 in contact with distal portion of index finger 32. Third concave depression 28 has a shape designed to fit that portion of a middle finger 38 at or near a first joint thereof, on a side nearer index finger 32, with middle finger 38 oriented in a position roughly halfway between a direction along the longitudinal axis of writing instrument 12 and a direction at right angles thereto.

Concave depression 26 is shown clearly in the side view of FIG. 2 as having a shape somewhat like an elongated kidney bean, with an upcurved portion 36 near smaller end 22 of body 14 and a similar, though less prominently upcurved portion 40 near bulbous end 18 of body 14.

As shown in the exploded, multisectioned view of FIG. 3, the slices of body 14 on which depressions 24, 26, and 28 lie are roughly equilaterally triangular in shape. Slice 3a shows end face 22 with 20 and the beginning of depression 26. Slice 3b shows portions of depressions 24, 26, and 28 positioned approximately at 120-degree intervals in a circumferential traverse of the slice. Slices 3c–3e include the major portions of concave depressions 24, 26, and 28. Slice 3f shows a small remaining portion of depression 26 and the beginning of bulbous end 18 of body 14 Slices 3g and 3h show the remaining major portion of bulbous end 18.

Concave depression 24 is clearly shown in FIG. 4 as shaped somewhat like a lima bean or a slice from a loaf of bread. Since depression 24 is intended to accommodate the thumb of a user, it has the largest area of the three depressions 24, 26, and 28 The deepest portions of depression 24 lie roughly along a line running from first end 16 to second end 18 of body 14, in the middle of depression 24.

FIG. 5 shows, in a perspective view, details of depression 28, which consists of a first portion 42 curved upward toward end 16 and a second portion 44 curved upward toward end 18. Portions 42 and 44 meet in a curved crease line 46 running diagonally across the area covered by depression 28. Crease line 46 is in the shape of a curved line segment having an inflection point (as defined in analytic geometry) at the center of the segment. A line tangent to the curved line segment at the inflection point would make an angle of about 45 degrees with respect to a perpendicular projection of the longitudinal axis of cylindrical hole 20 onto a plane containing a portion of the curved line segment centered on the inflection point.

FIGS. 5 and 6 also show, in more detail than FIG. 2, the concave curvature of depression 26. A first portion 48 slopes upward toward end 18 more gradually than portion 36 slopes upward toward end 16 of body 14. The maximum depth of depression 26 occurs about a third of the way between the end of the depression 26 nearest end 16 and the end of the depression 26 nearest end 18.

Preferably there are two model sizes of writing aid 10: one for regular or larger hands and one for small hands. In the preferred embodiment for small hands, writing aid 10 has an overall length between first end 15 and second end 18 of body 14 of approximately 3.5 cm, a circumference of first end face 22 of body 14 of approximately 5.5 cm, and a largest circumference of body 14 at bulbous end 18 of approximately 7.5 cm. Depression 24 has a nearly constant length of about 2.5 cm and a nearly constant width of width of 1.0 cm. The length of depression 26 is about 2.2 cm, with a nearly constant width of about 1.0 cm. Third depression 28 has a nearly constant length of about 2.0 cm and a nearly constant width of about 1.7 cm.

In the preferred embodiment of writing aid 10 for regular or larger hands, body 14 has an overall length between first end 16 and second end 18 of approximately 5.0 cm, first end 16 at end face 22 has a circumference of approximately 5.5 cm, and a largest circumference of the body 14 at second end 18 is approximately 8.5 cm. Depression 24 has a nearly constant length of about 3.0 cm and a nearly constant width of width of 1.5 cm. The length of depression 26 is about 3.0 cm, with a width varying between about 1.0 cm and 1.3 cm. Third depression 28 has a nearly constant length of about 2.0 cm and a nearly constant width of about 1.7 cm.

In the preferred embodiment writing aid 10 comprises a soft, resilient, pliable material, such as soft rubber or a suitable synthetic plastic. Rubber of Shore weight density A 27 is a particularly suitable material for construction of writing aid 10. The softness of the texture of body 14 made of such a material does not put pressure on the fingers of the writer and prevents slippage during use.

Indicia can provided on some suitable portion or portions of body 14 of writing aid 10 to indicate the proper orientation of the aid on a writing instrument and to indicate which finger of the user is to contact which portion of the aid. For example, as shown in FIGS. 2 and 4, small circular depressions with raised letters "L" or "R" therein are provided in the preferred embodiment to indicate the position of the user's thumb for left- and right-handed individuals, respectively. In FIG. 2, the raised letter "L" is provided inside a small concave circular depression near the second large depression to indicate that a left-handed person should place his or her thumb on second large depression 26. In FIG. 4, the letter "R" is provided inside a small concave circular depression as shown to indicate that a right-handed user should place the thumb on first large depression 24. It would be desirable to avoid placing any raised or engraved indicia on the finger-gripping portions of writing aid 10 to avoid interference with the "feel" of the aid by preventing contact between the indicia and the fingers.

While specific embodiments of the invention have been described and illustrated, it should be understood that these embodiments are provided by way of example only, and that the invention is not to be construed as limited thereto, but only by the proper scope of the following claims. For example, the extreme end part of bulbous end 18 could be truncated or shaped slightly differently without altering the functionality of the bulbous end 18. Although it has been found that the embodiment described and claimed can be used effectively by either right-handed or left-handed writers, it would be a simple matter to reverse the positions of first depression 24 and second depression 26 to preserve the mirror symmetry of the original conception. Also, the diameter of hole 20 can be varied to accommodate differently sized writing instruments. Minor modifications can be made to writing aid using methods and information well-known in the art without departing from the scope and spirit of the present invention.

We claim:

1. A writing aid comprising:
a generally longitudinally extending pear-shaped body defining a substantially triangularly contoured cross-sectional area having a first end section and second bulbous end section, said first end section having a cross-sectional area substantially less than a cross-sectional area of said second bulbous end section, said body having a longitudinally directed through passage for insert therethrough of a writing implement, said pear-shaped body consisting of first, second and third external surfaces for contiguous interface respectively with a user's thumb, index finger and middle finger, said first surface being continuously concave and extending from said first end section to said second bulbous end section for contiguous interface with substantially the entire contacting area of a first joint of said thumb of said user, said second surface being continuously concave and extending from said first end section to said second bulbous end section for contiguous interface with a first joint and at least a portion of a second joint of said index finger, said third surface being continuously concave in said longitudinal direction and located in said first end section for contiguous interface with said middle finger of said user, each of said surfaces defining a respective side of said triangularly contoured cross-sectional area of said pear-shaped body, whereby when said writing instrument is inserted through said passage in said longitudinally extending pear-shaped body with a writing tip extending therethrough and adjacent said first end section, said body acts as an aid in achieving a correct, relaxed writing position of the fingers and hand of said user.

2. The writing aid of claim 1 wherein said second end of said body comprises a generally ovoid, bulbous portion with a flattened region near said first concave surface which defines a first depression.

3. The writing aid of claim 1 wherein said first end is truncated from the general shape of a pear and has a flat end surface generally perpendicular to said longitudinal axis of said body.

4. The writing aid of claim 1 wherein said first depression has a shape to accommodate that portion of a human thumb comprising most of the ball and tip thereof on a side of said thumb nearer said index finger, and extending from near said tip of said thumb to a first joint of said thumb.

5. The writing aid of claim 4, wherein said first depression has a shape roughly in the outline of an elongated lima bean, and a maximum depth between about 2 and 5 mm.

6. The writing aid of claim 1 wherein said second concave surface defines a second depression having a shape to accommodate the index finger of a human hand, with a lower tip of said index finger, opposite a nail of said index finger, resting on said second depression, said second depression having an upcurved portion adjacent said first end of said body in contact with a distal portion of said index finger.

7. The writing aid of claim 6 wherein said second depression has a shape roughly in the outline of an elongated kidney bean, with a maximum depth between about 2 and 7 mm.

8. The writing aid of claim 1 wherein said third concave surface defines a third depression having a shape to accommodate that portion of the middle finger of a human hand at a first joint thereof, on a side thereof nearer the index finger of the hand, with said middle finger oriented in a position approximately half way between a direction along said longitudinal axis and a direction transverse thereto.

9. The writing aid of claim 8, wherein said third depression has a maximum depth of between about 5 and 9 mm and further has a diagonal crease roughly in the shape of a curved line segment having an inflection point at the center thereof, with a line tangent to said curved line segment at said inflection point making an angle of about 45 degrees with respect to a perpendicular projection of said longitudinal axis onto a plane containing a portion of said curved line segment centered on said inflection point.

10. The writing aid of claim 1 wherein said substantially triangularly contoured cross-sectional area defines first, second, and third included angles, said first angle being approximately 60 degrees.

11. The writing aid of claim 10 wherein said second angle is approximately 60 degrees.

12. The writing aid of claim 10 wherein said third angle is approximately 60 degrees.

13. The writing aid of claim 1 wherein said body has an overall length between said first and second ends of approximately 5.0 cm, said first end has a circumference of approximately 5.5 cm, and a largest circumference of said body is approximately 8.5 cm.

14. The writing aid of claim 13, wherein said first depression has a length of approximately 3 cm and a maximum width of approximately 2 cm.

15. The writing aid of claim 13, wherein said second depression has a maximum length of about 3 cm and a minimum width of about 1 cm.

16. The writing aid of claim 13, wherein said third depression has a length of about 2.5 cm and a minimum width of about 1.5 cm.

17. The writing aid of claim 1 wherein an overall length of said body between said first and second ends thereof is approximately 3.5 cm, a circumference of said first end of said body is approximately 5.5 cm, and a largest circumference of said body is approximately 7.5 cm.

18. The writing aid of claim 17, wherein said first depression has a length of approximately 3 cm and a maximum width of approximately 2 cm.

19. The writing aid of claim 17, wherein said second depression has a maximum length of about 3 cm and a minimum width of about 1 cm.

20. The writing aid of claim 17, wherein said third depression has a length of about 2.5 cm and a minimum width of about 1.5 cm.

21. The writing aid of claim 1 wherein said body comprises a soft, resilient material.

22. The writing aid of claim 21, wherein said material comprises rubber.

23. The writing aid of claim 21, wherein said material comprises a synthetic plastic.

24. The writing aid of claim 1 further comprising indicia on said body to indicate a proper orientation of said body on said writing instrument and in said hand, said indicia being located on portions of said body excluding said first, second, and third depressions.

25. The writing aid of claim 24 wherein said indicia comprise first and second small circular depressions at said second end of said body near said first and second depressions, respectively, with a raised letter "R" inside said first small circular depression and a raised letter "L" inside said second small circular depression, said letters being oriented with their bases nearest the respective depressions to which they are adjacent.

* * * * *